US012288440B2

(12) United States Patent
Audia

(10) Patent No.: US 12,288,440 B2
(45) Date of Patent: Apr. 29, 2025

(54) GAMING MACHINE AND METHOD WITH CASCADE FEATURE

(71) Applicant: Everi Games Inc., Austin, TX (US)

(72) Inventor: Cydny Bloem Audia, Chicago, IL (US)

(73) Assignee: Everi Games Inc., Austin, TX (US)

( * ) Notice: Subject to any disclaimer, the term of this patent is extended or adjusted under 35 U.S.C. 154(b) by 467 days.

(21) Appl. No.: 17/959,133

(22) Filed: Oct. 3, 2022

(65) Prior Publication Data

US 2024/0112526 A1 Apr. 4, 2024

(51) Int. Cl.
*G07F 17/32* (2006.01)
*G07F 17/34* (2006.01)

(52) U.S. Cl.
CPC ...... *G07F 17/3213* (2013.01); *G07F 17/3262* (2013.01); *G07F 17/3267* (2013.01); *G07F 17/34* (2013.01)

(58) Field of Classification Search
CPC ............. G07F 17/3213; G07F 17/3262; G07F 17/3267; G07F 17/34
See application file for complete search history.

(56) References Cited

U.S. PATENT DOCUMENTS

2007/0060248 A1 * 3/2007 Rodgers .................. G07F 17/32 463/16

* cited by examiner

*Primary Examiner* — Thomas H Henry
(74) *Attorney, Agent, or Firm* — Calvert Technology Law, PLLC; Nathan H. Calvert

(57) ABSTRACT

A gaming machine, system, method, and program product provide a slot machine game with a mystery symbol indicator. Responsive to a play input, a base result representation is shown a matrix of symbol locations. Responsive to a winning pattern formed in the base result representation, cascade sequences occur in which symbols participating in any winning combination are removed from matrix, further symbols drop into the symbol locations of the removed symbols, and a cascade result is evaluated. Mystery symbol indicators are provided in the base result representation, which are configured to temporarily conceal and then reveal a symbol during a reel spin animation of the base result representation, once appearing in the base result representation, persist in the matrix of symbol locations during the one or more cascade sequences, and temporarily conceal and then reveal a new symbol during at least one of the one or more cascade sequences.

15 Claims, 19 Drawing Sheets

GAMING MACHINE AND METHOD WITH CASCADE FEATURE

FIELD OF THE INVENTION

This invention relates to gaming systems and to gaming machines through which players may participate in wagering games, and in particular gaming machines including games with enhanced bonus features.

BACKGROUND

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. A typical reel-based slot machine game includes a number of paylines defined through symbol locations on a reel. Bonus features for such games may be shown on mechanical or simulated wheels, which conduct a free spin to select a bonus prize or a jackpot prize.

A popular use of wagering games is simulated wagering in which money is never involved, and instead points or simulated currency are wagered. Many "virtual casino" websites and smartphone apps employ such a scheme in addition to or instead of money wagering. Numerous variations are used to improve the prize variability and player enjoyment associated with such payline games. However, game manufacturers are continuously pressed to develop new game presentations, formats, and game graphics in an attempt to provide high entertainment value for players and thereby attract and keep players.

SUMMARY OF THE INVENTION

The present invention encompasses methods for controlling games, gaming machines, and computer programs that provide enhanced gaming features including a persistent mystery symbol indicator.

According to one aspect of the invention a method is provided for operating a gaming machine. Responsive to a play input, a base result representation is shown a matrix of symbol locations. Responsive to a winning pattern formed in the base result representation, cascade sequences occur in which symbols participating in any winning combination are removed from matrix, further symbols drop into the symbol locations of the removed symbols, and a cascade result is evaluated. Mystery symbol indicators are provided in the base result representation, which are configured to temporarily conceal and then reveal a symbol during a reel spin animation of the base result representation, once appearing in the base result representation, persist in the matrix of symbol locations during the one or more cascade sequences, and temporarily conceal and then reveal a new symbol during at least one of the one or more cascade sequences. Another aspect of the invention is a gaming machine performing one or more of the methods described herein. Yet another aspect of the invention is a computer program stored on one or more non-transitory computer readable medium. The software version is, of course, typically designed to be executed by a gaming machine or networked gaming system to perform one of more of the methods described herein. The software includes multiple portions of computer executable code referred to as program code. Gaming results are provided in response to activations and displayed by display program code that generates simulated slot reels each including one or more symbol locations. The program also has game controller program code for determining game play results involving operating the gaming machine according to the methods above.

Another aspect of the invention is a gaming system that includes one or more gaming servers, and a group of electronic gaming machines connected to the servers by a network, programmed to provide one of more of the methods described herein. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DETAILED DESCRIPTION OF EXAMPLE EMBODIMENTS

Figure 1:
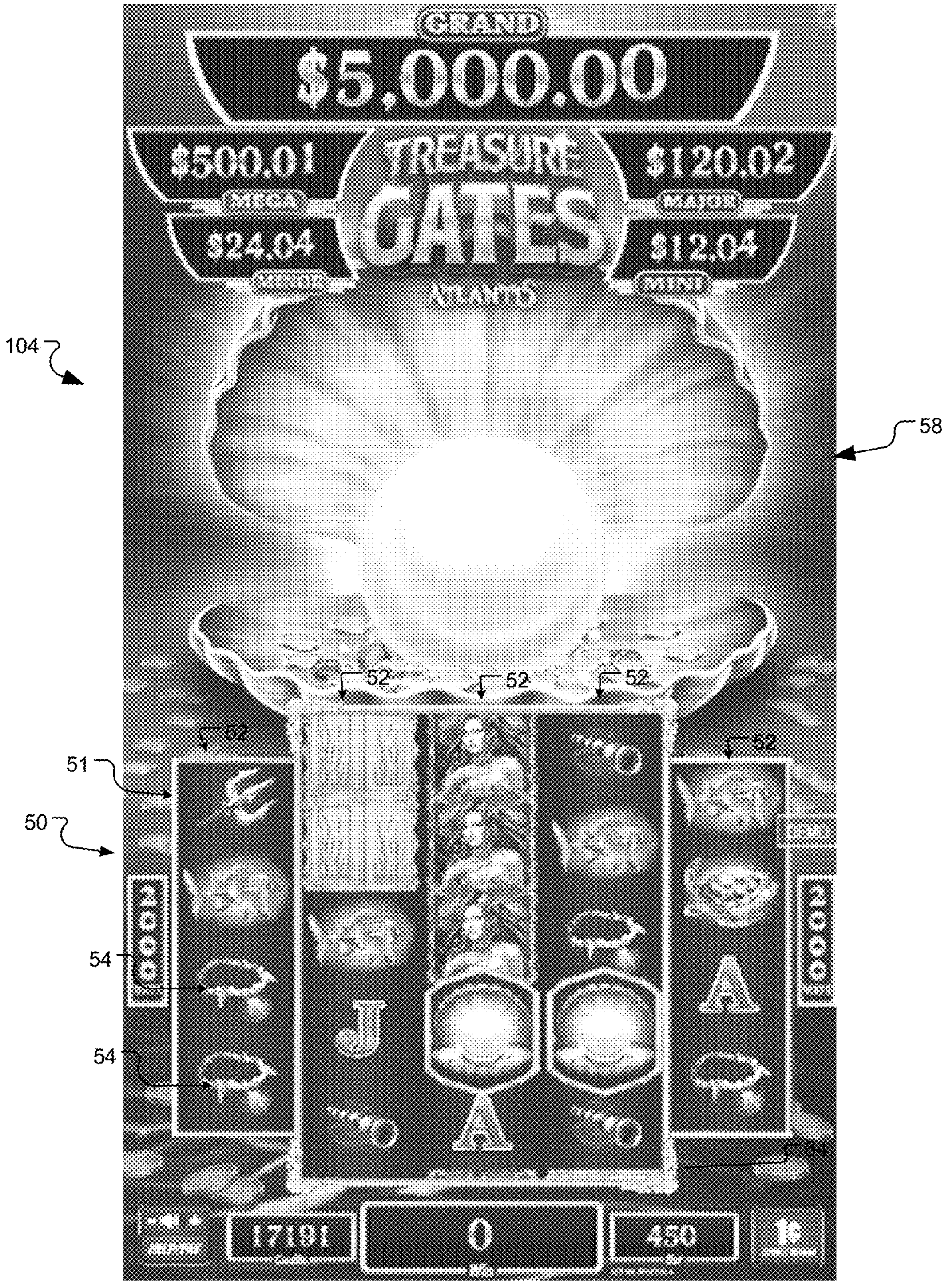
FIG. 1 depicts a game screen employed in a base game outcome at a gaming machine according to some embodiments.

FIG. 1 is a game screen diagram illustrating a first base game mode showing a primary display 104 to illustrate an example slot machine display arrangement on which wagering game results are presented in a primary display area 50, typically found on the primary display. A secondary display area 58 is present on the display 104, typically located toward the top of the display. In versions including multiple displays, secondary display area 58 may be located on a secondary, upper display.

The primary display area 50 in the depicted mode presents a reel-type primary game (as opposed to bonus games or other feature games as described herein), which in this version includes a matrix 51 of symbol locations 54 arranged in rows and columns to represent simulated slot machine reels that are spun to conduct a game round. Other embodiments may, of course, use other types of game displays to display randomizing of symbols according to the methods herein. The depicted columns 52 of symbol locations represent the simulated reels, while symbols are shown in each symbol location designated 54. In this implementation there are five reels with four or five symbol locations 54 displayed at a time on each reel, but the game can be played with a different number and size of reels. Below the five reels may be referred to, from left to right, as "reel 1", "reel 2", "reel 3", "reel 4", and "reel 5". The simulated reel typically has far more symbols than those displayed, and as many unique stop positions as there are symbols on the simulated reel. The stop position may be counted, for example, by numbering the symbols on the simulated reel and using the number of the symbol at the bottom of the display window (the three symbols displayed in this example), or at the top or middle. While columns are used herein, other lines of symbols such as rows may also be used to provide simulated reels or other symbol arrays that are filled with randomly selected symbols to produce game round results.

In this embodiment, secondary display area 58 shows progressive pries available to be won in the game, including a "GRAND" prize, a "MEGA" prize, a "MAJOR" prize, a "MINOR" prize, and a "MINI" prize. Other embodiments may instead include fixed bonus prizes presented in the same manner. Other touchscreen buttons for configuring the bet and activating play in the game, such as a "play" button, may be present in primary display area 50. In some embodiments, winning patterns are formed by scatter patterns of various numbers of symbols, and in some embodiments winning patterns are matching symbols along defined paylines that pass through the matrix 51.

Figure 10:
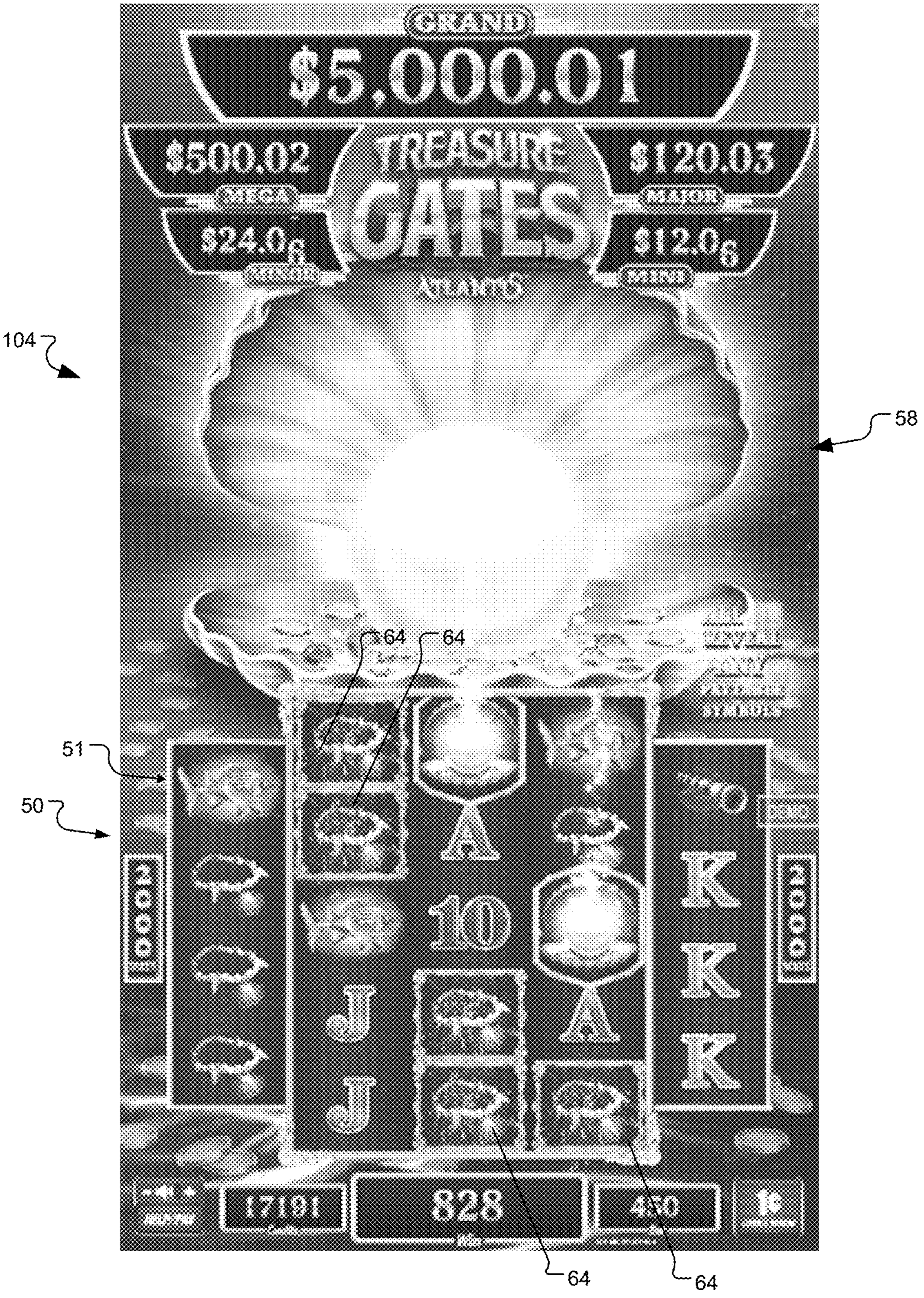
Figure 11:
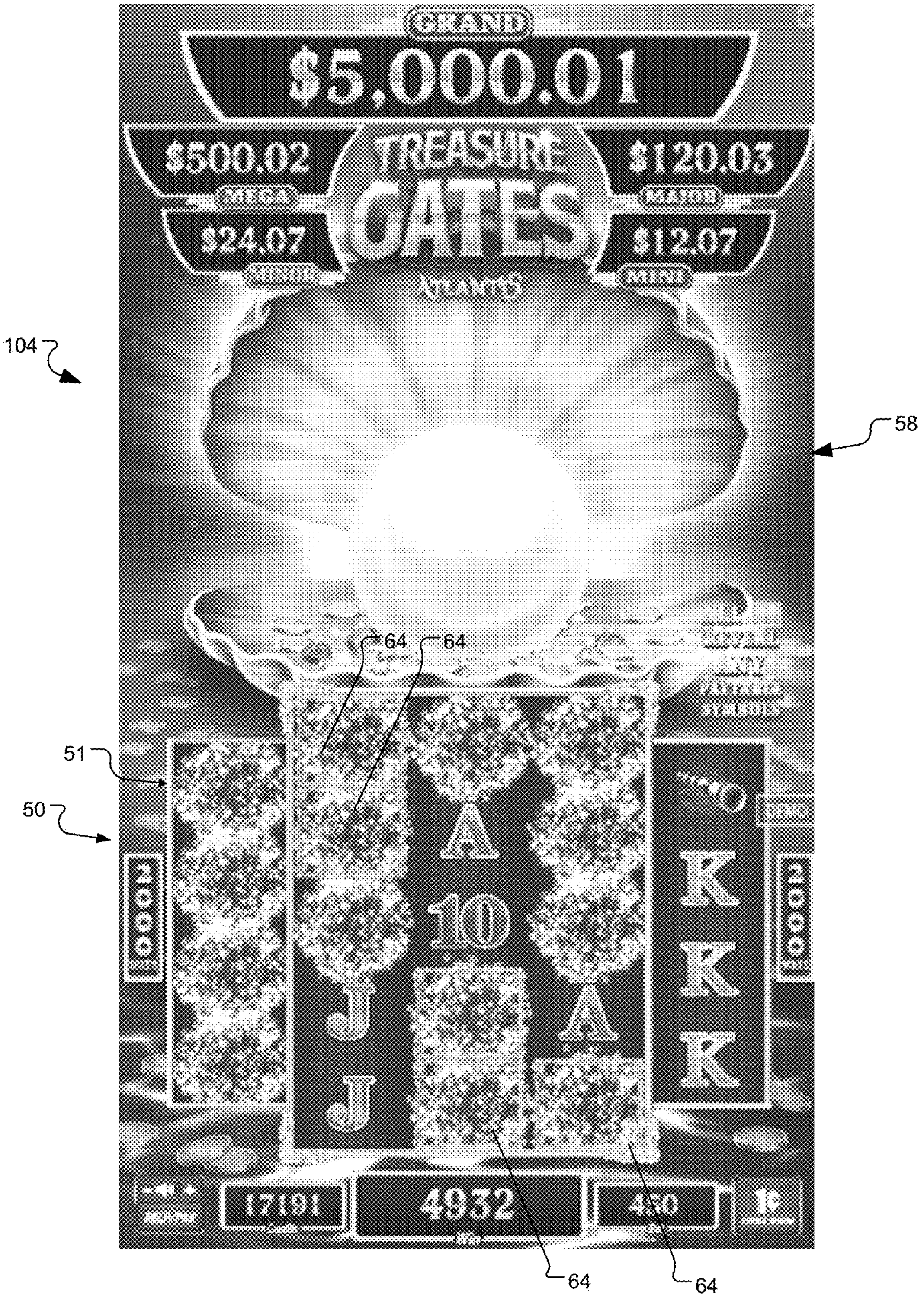
Figure 12:
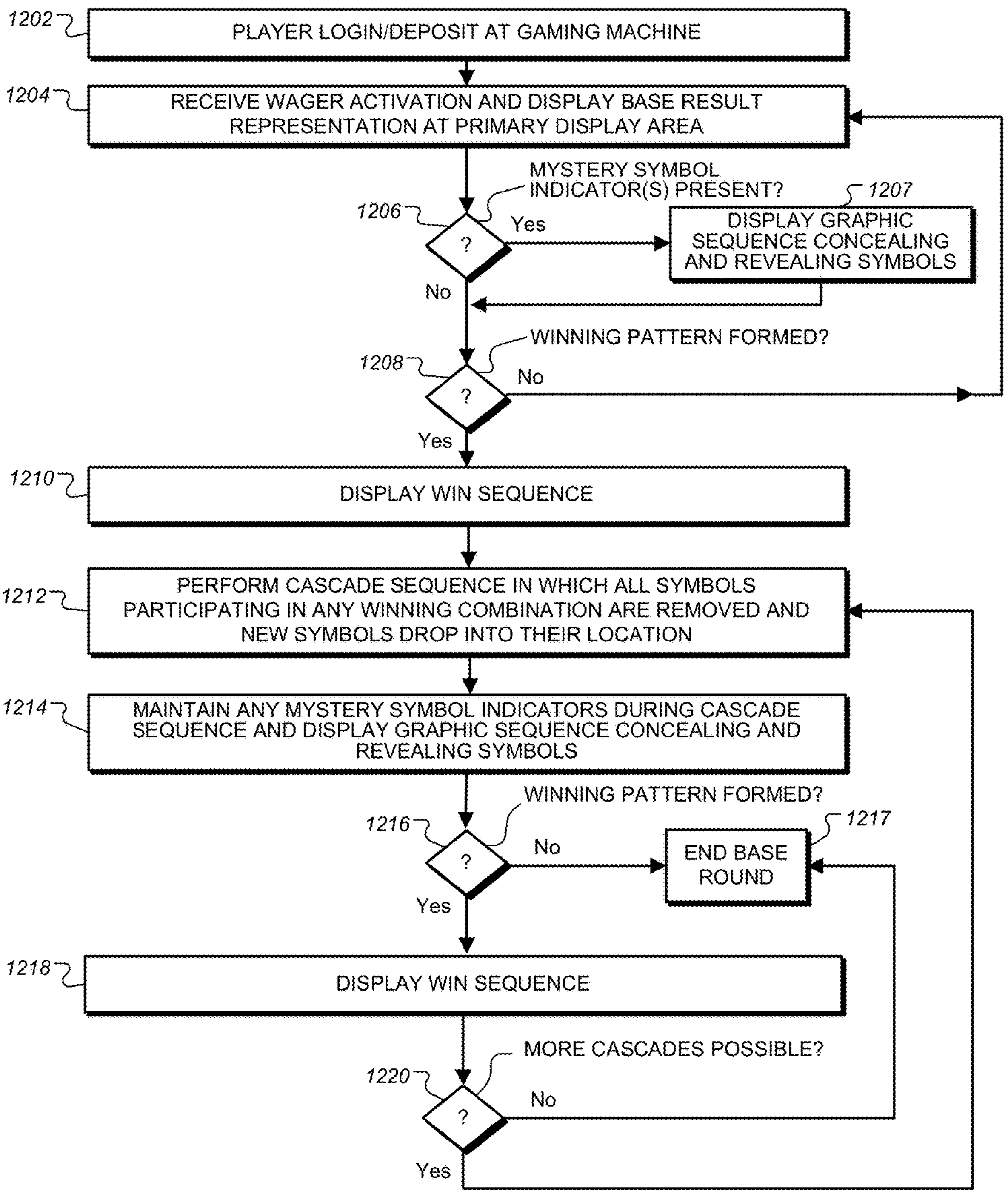
FIG. 12 shows a flowchart of a process for operating a gaming machine according to some embodiments.

FIG. 2 through FIG. 11 depict a sequence of game screens showing a mystery symbol indicator which persist during a cascade feature according to some embodiments. FIG. 12 shows a flowchart of a process for operating a gaming machine according to some embodiments. The process will be described with reference to FIG. 12 and the game screen diagrams of FIGS. 1-11. Generally, the process is performed responsive to play activation inputs entered through a player input device of the gaming machine and under control of a processing system of the gaming machine executing game presentation program code. The process beings at block 1202 where a player logs into a gaming machine or makes a credit deposit to establish a credit balance at the gaming machine. Where credit deposits are used, they include receiving the player deposit through a credit input device such as a bill/voucher acceptor, and in response activating a credit meter value that establishes a player credit balance. Other non-financial points may be used in which points are risked and awarded in the game having no financial value, in some embodiments.

To begin a game play, at block 1204 the process receives a wager activation, which may be a financial wager with money value credits or an activation of a game play for a game based on non-financial points with no financial value. The activation is made on a player input device at the gaming machine, which typically consists of some input from the player to set the amount to be wagered from their credit amount on the machine and activate a game round using the set wager amount. The wager amount may also be carried over from previous game rounds by simply starting the game with the previous wager amount set. This typically happens through a 'Play' button (110, FIG. 17) on the game cabinet or touchscreen display, and serves to place the wager and start a single round of game play in the base game. The game round includes randomly selecting symbols to populate matrix 51 and displaying matrix 51 being updated to include the selected symbols as depicted, for example, in the embodiment of FIG. 1.

Figure 3:
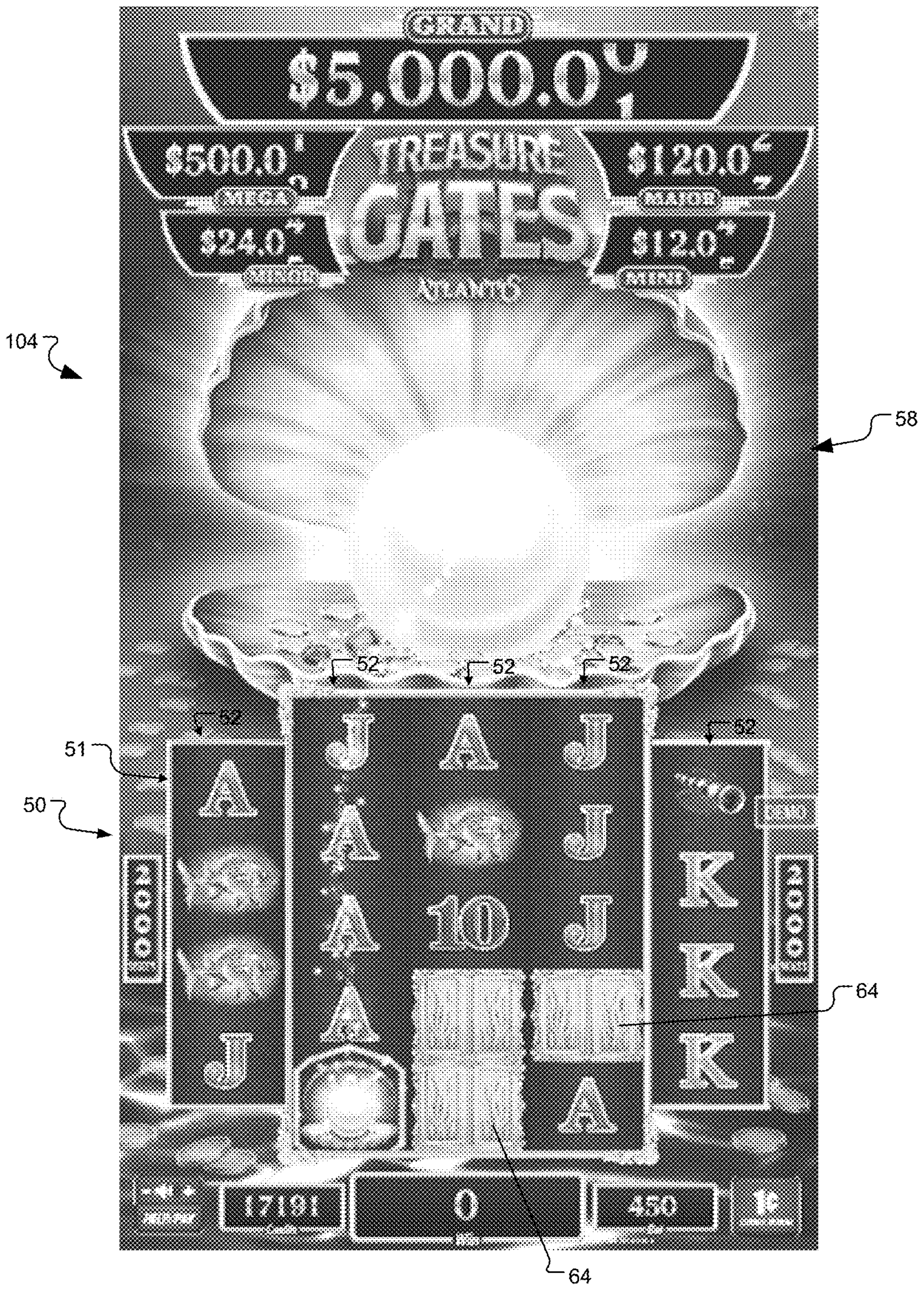
Figure 4:
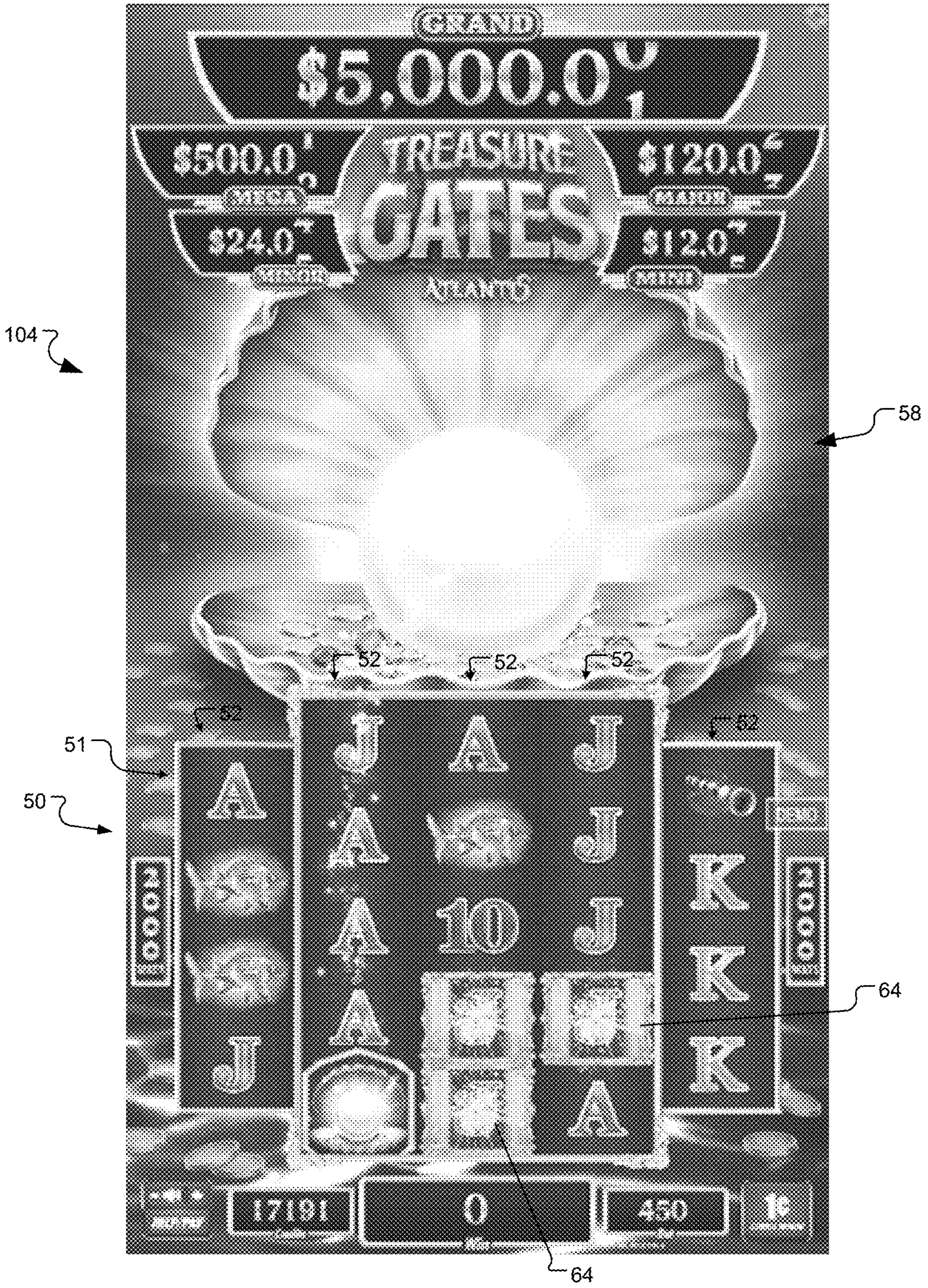
Figure 5:
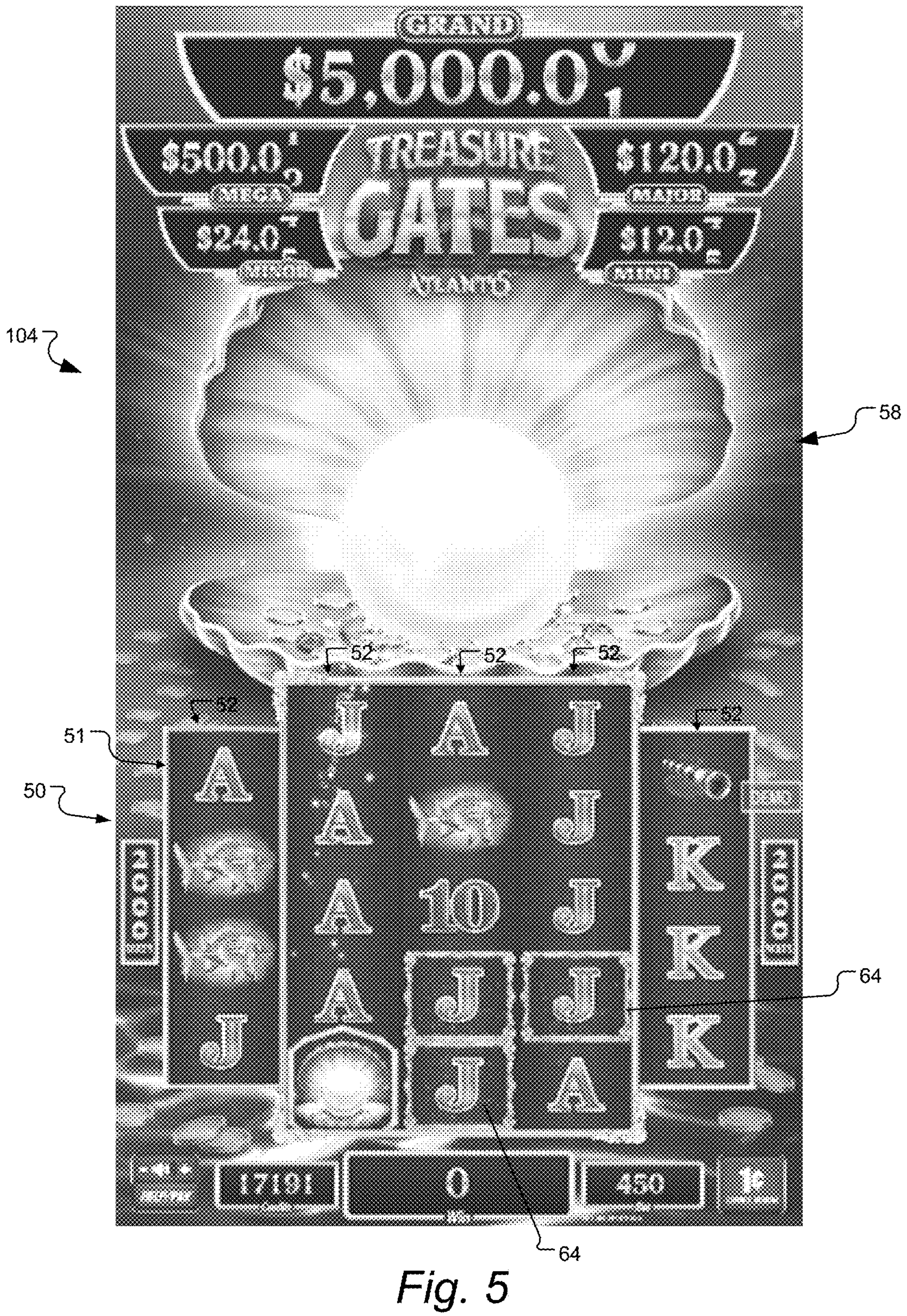

At block 1206, the process checks for the presence of any mystery symbol indicators in the base game result. In the example sequence of FIG. 2, two mystery symbol indicators 64 are shown appearing on reel 3, and one on reel 4. Generally, the mystery symbol indicators 64 are active graphic modifications to their respective symbol locations 51, and are configured to temporarily conceal and then reveal a symbol during a reel spin animation of the base result representation, and once appearing in the base result representation, persist in the matrix of symbol locations during the one or more cascade sequences, and temporarily conceal and then reveal a new symbol during at least one of the one or more cascade sequences. If mystery symbol indicators 64 are present at block 1206, the process goes to block 1207 where it displays a graphic sequence temporarily concealing and then revealing symbols at the locations including mystery symbol indicators 64. An example of such a sequence is shown for this embodiment in sequence of FIGS. 3-5, where mystery symbol indicators 64 are present in the base result representation of FIG. 3, initially concealing the symbols at their respective symbol locations. Then, as shown in FIG. 4, a graphic sequence is performed at each of those symbol locations to reveal the symbols thereon. In this embodiment, the mystery symbol indicators 64 are represented as "Treasure Gates", which are animated to open as shown in process in FIG. 4. Then, as shown in FIG. 5, mystery symbol indicators 64 are fully open to reveal the symbols previously concealed, this this example result three "J" symbols. The mystery symbol indicators 64 remain at their respective symbol locations 51 as indicated by the gate frame graphic depicted at those locations. In this embodiment, mystery symbol indicators 64 are further configured to reveal a symbol identical to that of all other mystery symbol indicators, both during the initial base result representation and during one or more cascade sequences, as further described below. Preferably the symbol is randomly selected, or part of a randomly selected outcome. The process then goes to block 1208.

If no mystery symbol indicators 64 are present, the process goes to block 1208, where it evaluates the base game result for winning patterns. Block 1208 may include conducting other bonus features, such as pick bonus games or free spin bonus rounds. If no winning pattern is formed at block 1208, the process returns to block 1204. If any winning patterns are formed at block 1208, the process goes to block 1210, where it displays a winning sequence to award a prize for the winning patterns formed.

Then, at block 1212, the process includes causing the display system to display one or more symbol cascade sequences in which symbols participating in any winning combination are removed from the respective result, further symbols drop into, or are otherwise populated into, the symbol locations of the removed symbols, and a cascade result is evaluated. Mystery symbol indicators 1214 are maintained during this cascade sequence, as shown at block 1214.

Figure 6:
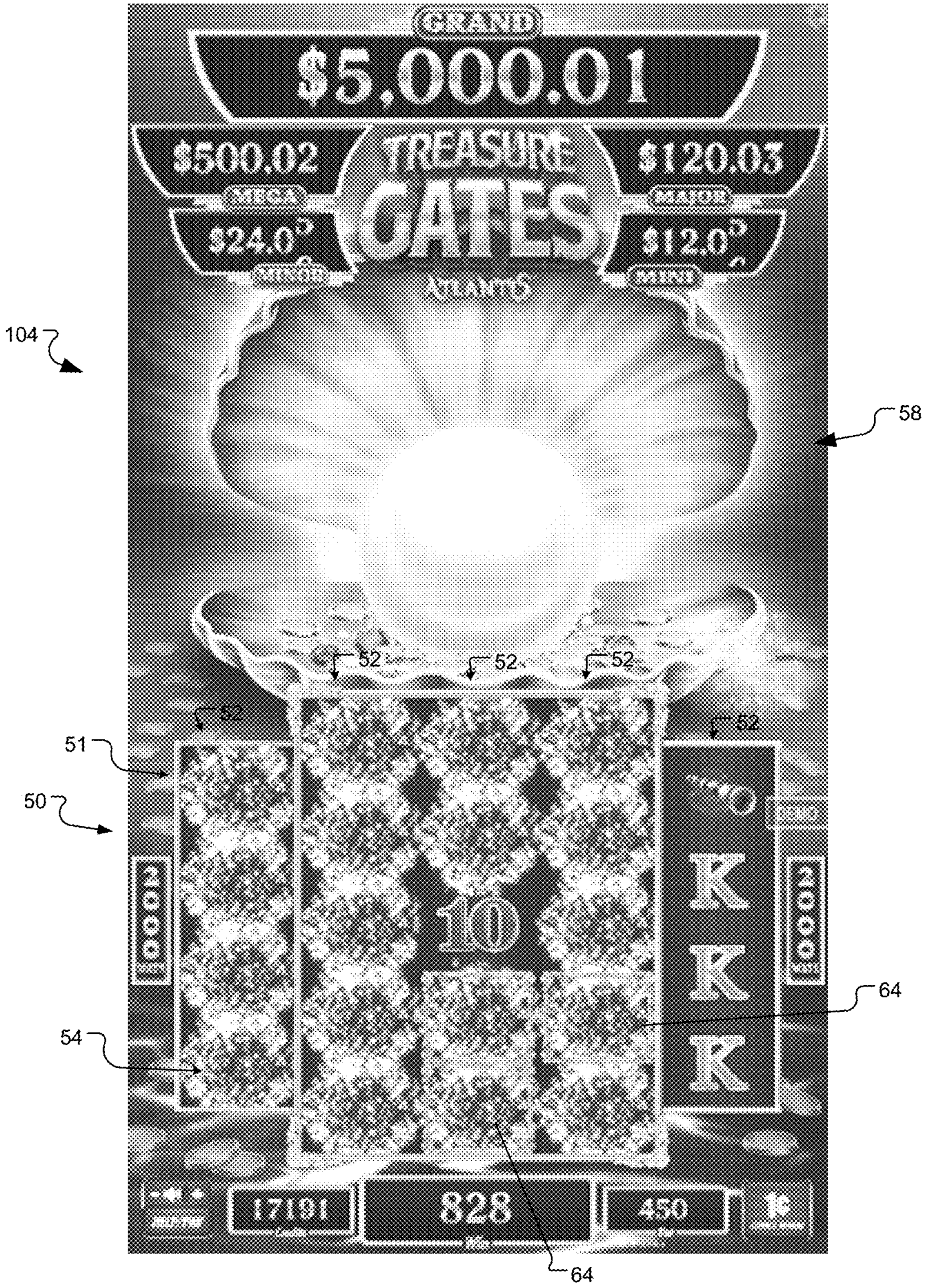
Figure 7:
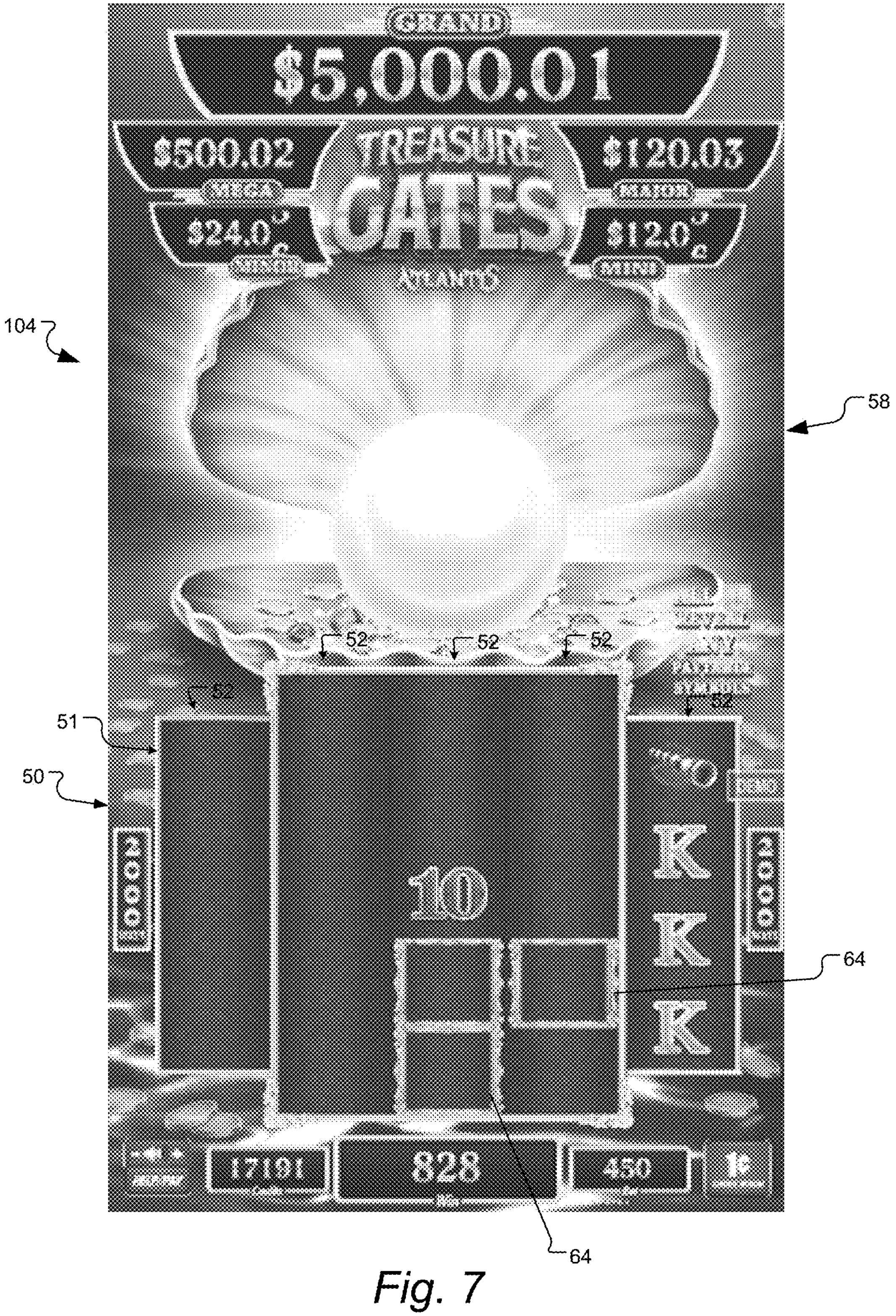

An example of a cascade sequence is shown in FIGS. 6-9. In FIG. 6, all of the symbols at symbol locations 54 participating in any winning pattern are shown to be removed, in this embodiment by a graphic animation sequence depicting the symbols exploding, as shown in process in FIG. 6, and the symbol locations 51 becoming empty, as shown in FIG. 7. Mystery symbol indicators 64 are maintained during this process (block 1214), even if the symbols at their respective locations are removed, as depicted by the frames remaining at locations including mystery symbol indicators 64 during the removal graphic animation sequence of FIGS. 6-7. Then, empty symbol locations 54 are populated with new symbols, in this embodiment by a graphic animation depicting symbols “cascading” or dropping into the locations from the top of columns 52, as shown in process in FIG. 8.

Figure 8:
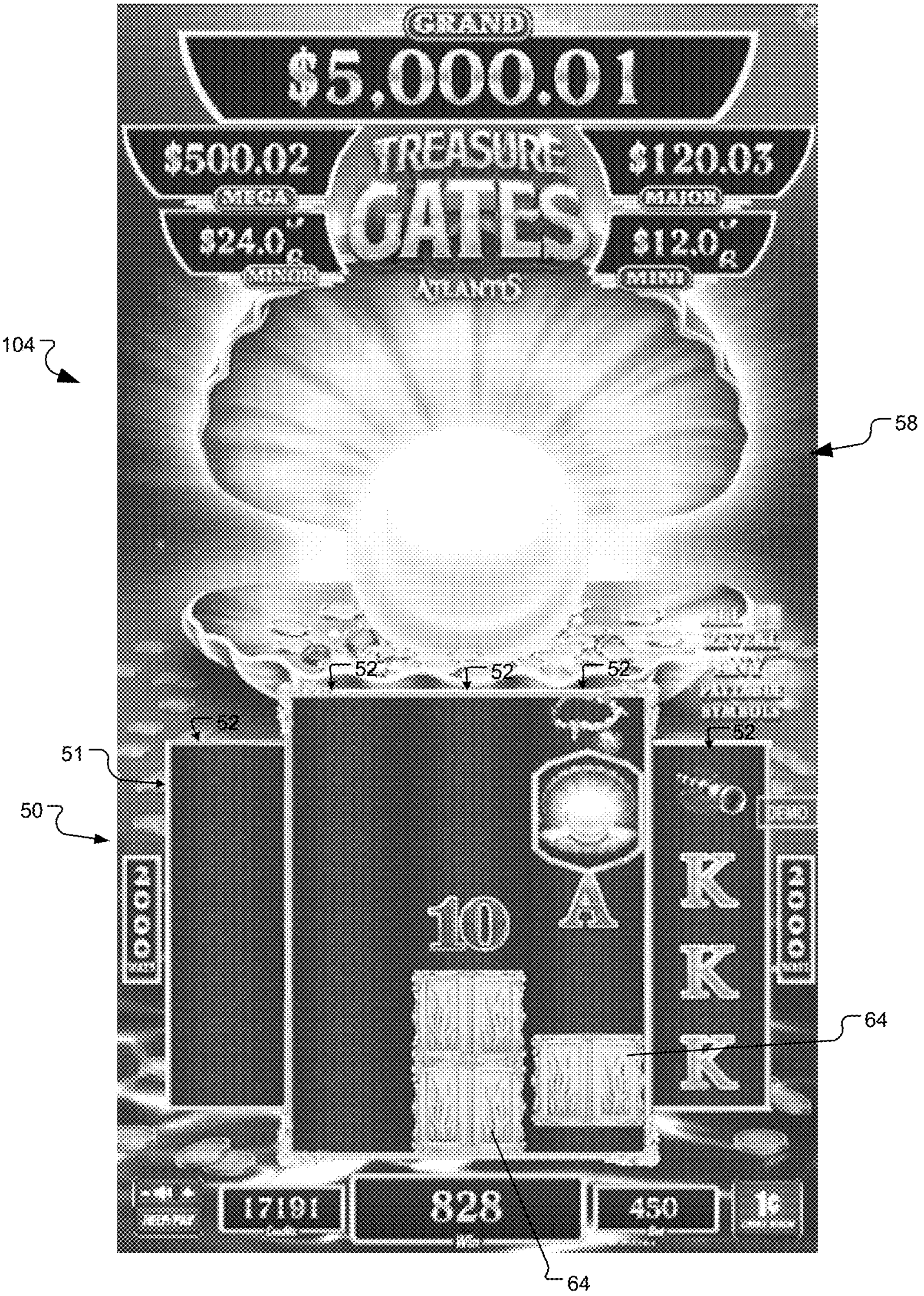
Figure 9:
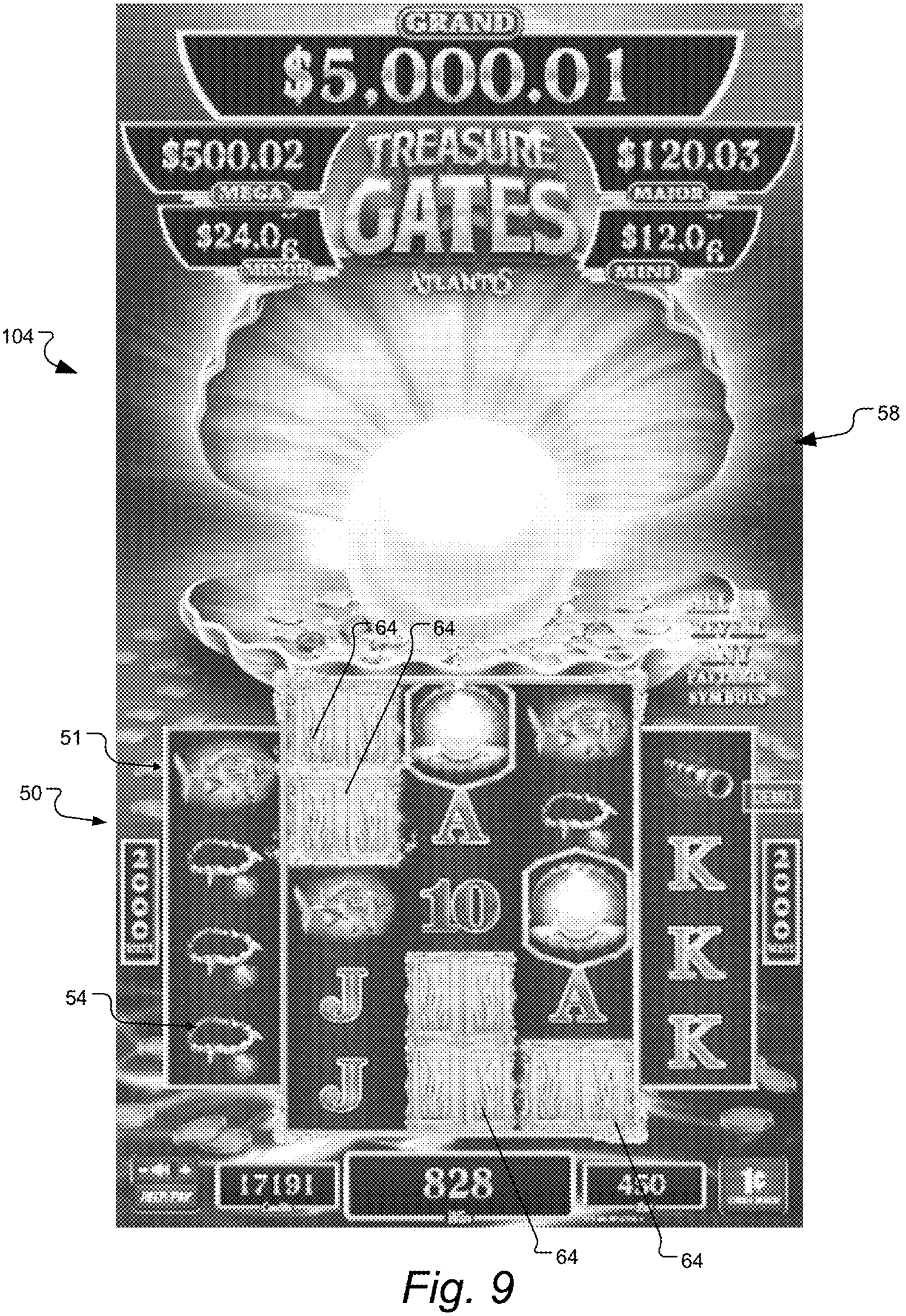

Mystery symbol indicators 64 at block 1214 again display a graphic sequence in which symbols are concealed and then revealed. New symbols may appear in at locations with mystery symbol indicators as a result of the cascade sequence. In some embodiments, the cascade sequence may include dropping an existing mystery symbol indicator 64 to a new symbol location 54 during a symbol cascade sequence responsive a symbol below it being removed. An example of this is shown in FIG. 8 where the mystery symbol indicator 64 in reel 4 is shown dropping to the lowest symbol location 54 because that location is empty. This mystery symbol indicator 64 is not removed, but merely moved. The symbols that did not participate in the winning patterns are maintained during the cascade sequence, as shown for example in FIG. 7 where the “10” symbol on reel three and the symbols on reel 5 are maintained. The new symbols provided in the cascade sequence may also include additional mystery symbol indicators 64, as depicted in the cascade result of FIG. 9 where two new mystery symbol indicator 64 appear on reel 2 after the cascade shown in process in FIG. 8. Mystery symbol indicator 64 act as described above during the cascade sequence, concealing and then revealing symbols at their respective symbol locations 54.

The cascade result is evaluated at block 1216, where the process checks for winning patterns formed by the new symbols and the symbols that were maintained through the cascade. If no winning patterns are formed, the process ends the base game round at block 1217. If winning patterns are formed, the process goes to block 1218 where it displays a win sequence and provides an award for the wining patterns. An example of this step is shown in FIG. 10, where a cascade result is shown being evaluated with winning patterns.

Then at block 1220, the process checks whether more cascades are possible. Generally, in this embodiment, more cascades are possible if symbol locations at the top symbol location 54 of any column 52 are participating in winning pattern, meaning that they will be removed in a cascade sequence to allow for at least one new symbol to cascade onto matrix 51. In other embodiments, other conditions may be used to determine if more cascades are possible. For example, an upper limit may be placed on the number of cascades. If more cascades are possible, the process returns to block 1212 to start a new cascade sequence. An example of beginning a new cascade sequence is shown in FIG. 11, where the symbols participating in a winning pattern in FIG. 10 are shown in process of being removed to begin a new cascade sequence.

Figure 2:
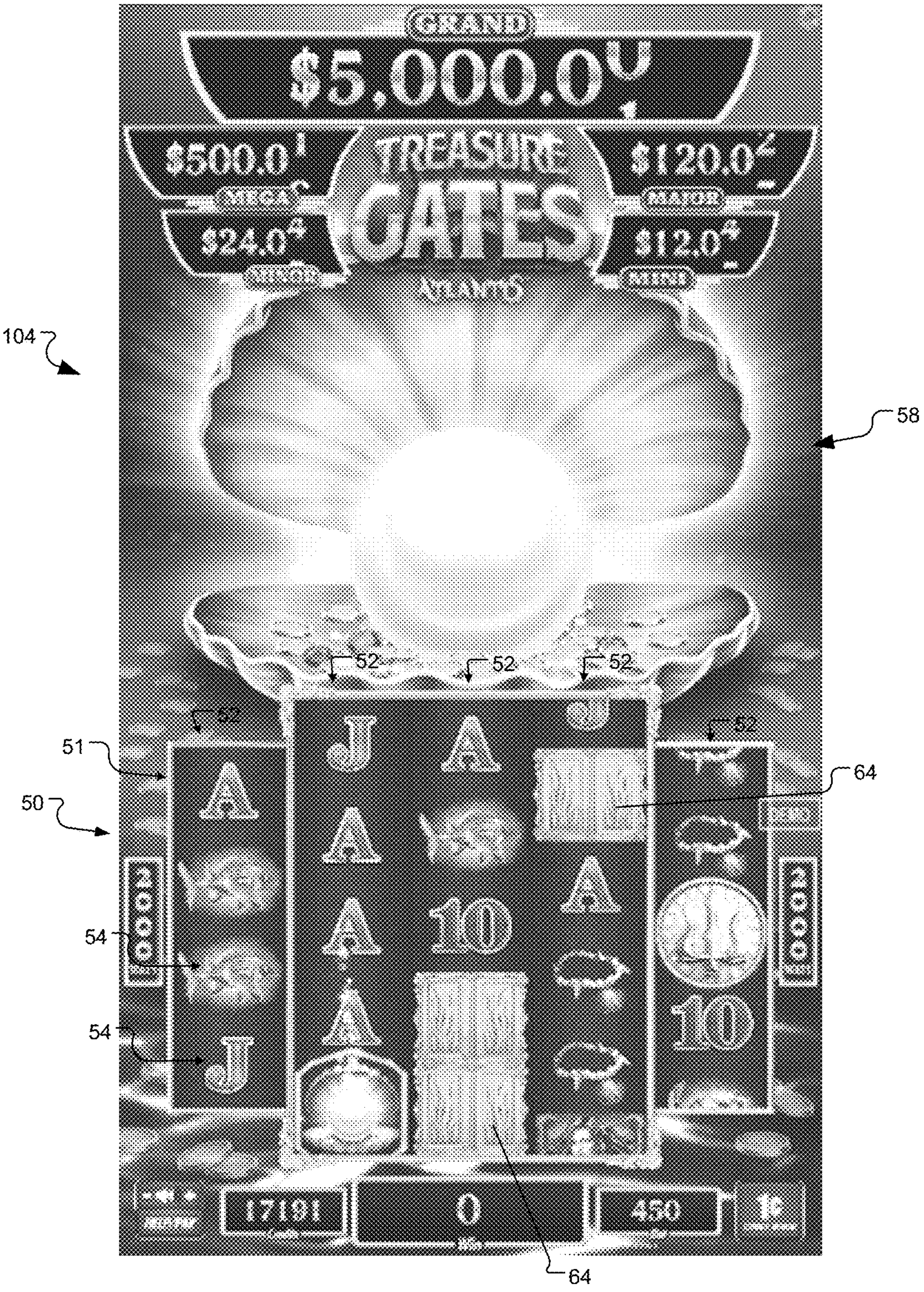
FIG. 2 through FIG. 11 depict a sequence of game screens showing a mystery symbol indicator used to present results according to some embodiments.
Figure 13:
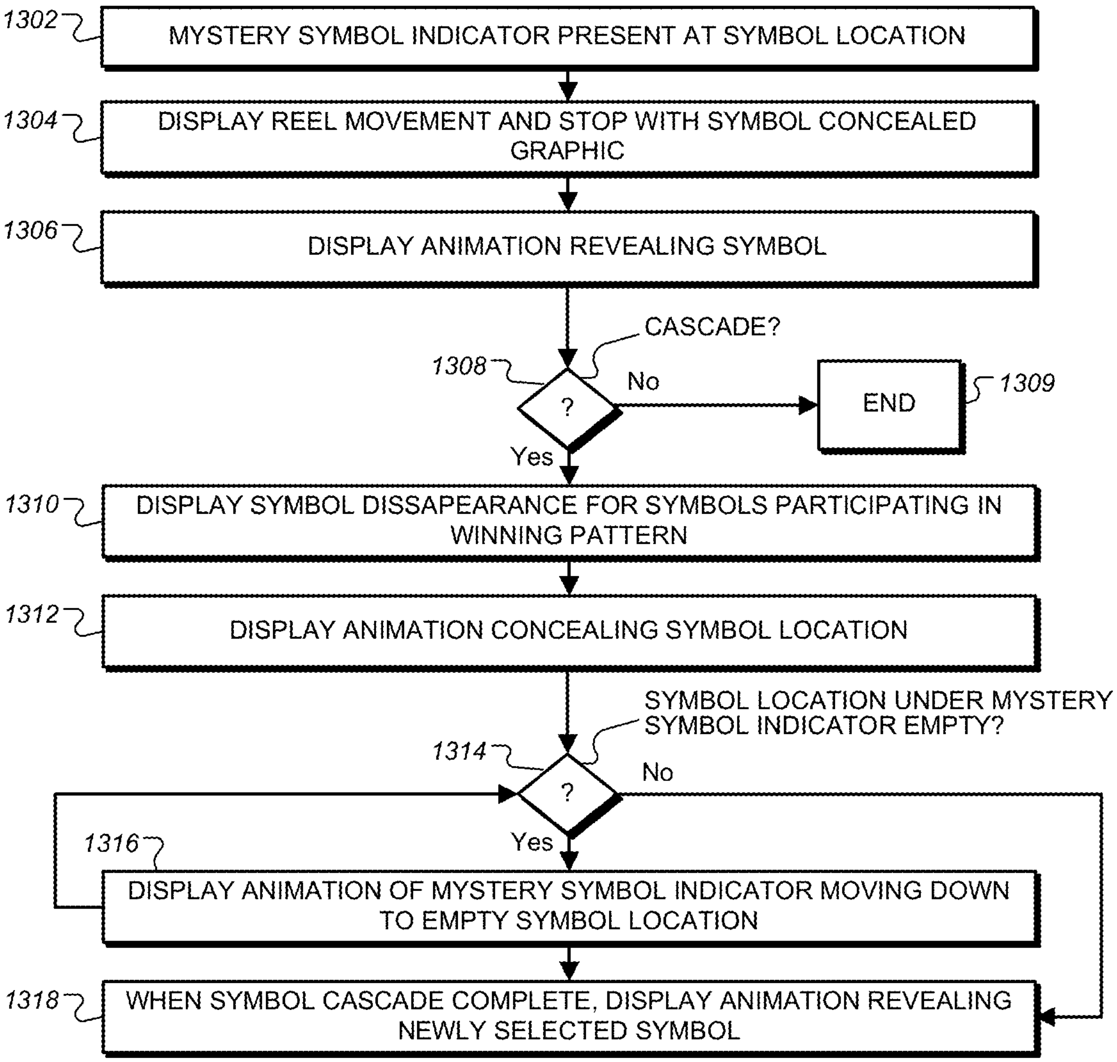
FIG. 13 shows a flowchart of a process for providing a mystery symbol indicator according to some embodiments.

FIG. 13 shows a flowchart including more detail of a process for providing a mystery symbol indicator according to some embodiments. The process is preferably executed a processor of a gaming machine as described herein, and is performed to provide the presentation of each mystery symbol indicator. At block 1302, an instantiation of the process occurs each time a mystery symbol indicator appears in at a symbol location of matrix 51. As shown at block 1304, when the reel or column 52 display process is conducted, the reel movement and stopping includes displaying a graphic for each mystery symbol indicator 64 with the symbol concealed, for example as shown in FIGS. 2-3. Then at block 1306, the process displays a graphic animation sequence associated with the mystery symbol indicator 64 for the symbol being revealed, such as the graphic animation depicted in process in FIG. 4 showing the “Treasure Gate” graphic opening the treasure gate to reveal a symbol.

If a cascade sequence occurs in the game at block 1308, the process goes to block 1310 where it displays another graphic animation sequence showing the symbol inside the mystery symbol indicator 64 disappearing for symbols that participated in the winning pattern, leaving an empty mystery symbol indicator 64 (FIG. 7). Then a graphic animation sequence is displayed showing the mystery symbol indicator 64 concealing the empty symbol location, such as by closing the “Treasure Gate”.

At block 1314, the process checks if the symbol location under each mystery symbol indicator 64 was made empty by the symbol disappearances at block 1310. If so, the process displays an animation of the mystery symbol indicator 64 moving down to the empty symbol location at block 1316. This move may be repeated until the mystery symbol indicator 64 reaches the bottom of array 51 or rests atop a non-empty symbol location, and then the process goes to block 1318. If the symbol location under mystery symbol indicator 64 at block 1314 is not empty, the process goes to 1318.

When the cascade process is complete, that is when the animation depicting symbols cascading onto matrix 51 (FIGS. 8-9) is complete, at block 1318 the process again displays the animation of mystery symbol indicator 64 revealing a newly selected symbol. The symbol selection is preferably made based on a randomly selected outcome. This selection may be done by direct selection with a random number or as part of a “prize first” result presentation, which may include randomly selecting a prize and then randomly selecting from a number of outcome presentations to display the prize. As discussed above, in the preferred embodiment each outcome with mystery symbol indicators 64 preferably includes identical symbols in all mystery symbol indicators 64. This is true in base game result presentation, cascade results, and free spin presentations and their cascade results. The depicted process for handling a cascade (blocks 1308-1318) is repeated for each cascade that occurs.

While the use of mystery symbol indicators 64 with a cascade feature are described above with respect to a base game result, in preferred embodiments the same feature is used in free spin bonus rounds, with each free spin proceeding according to blocks 1206-1220. In some embodiments, additional features are employed during a free spin round in combination with the cascade and mystery symbol indicators features described above.

Figure 14:
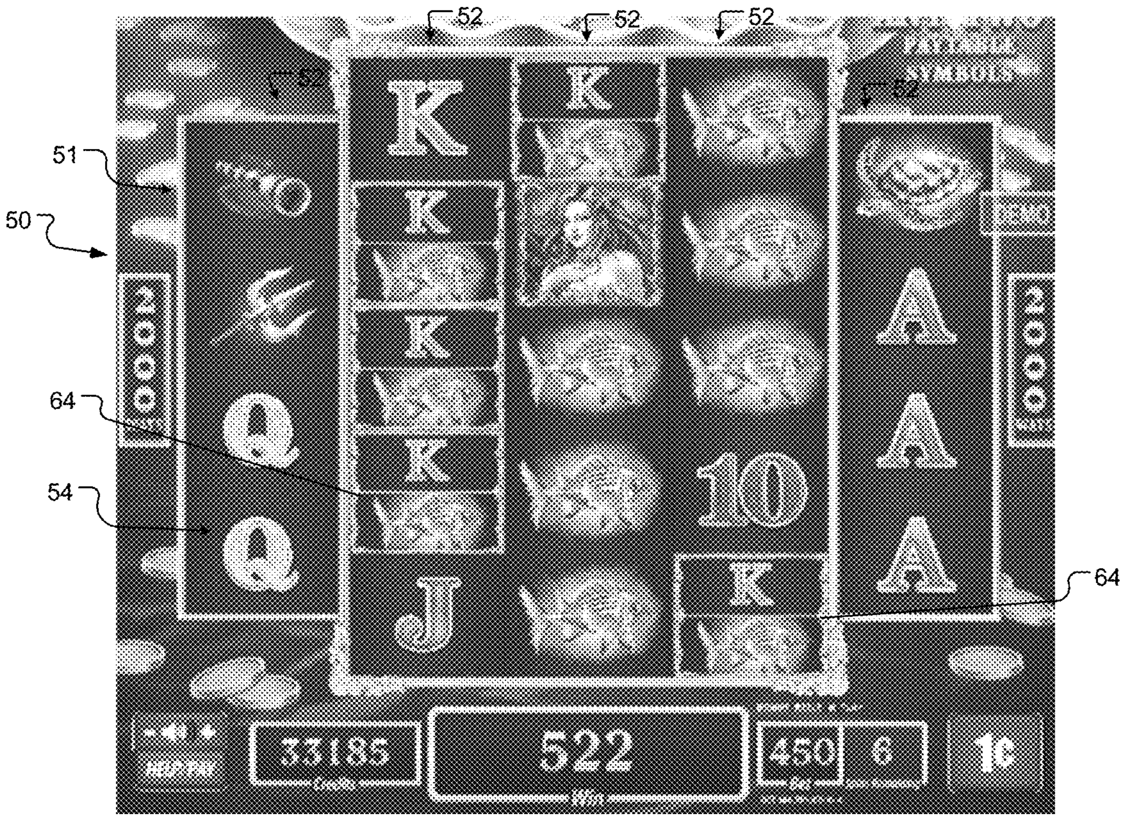
FIG. 14 shows a partial game screen of a free spin bonus round including a mystery symbol indicator according to some embodiments.

For example, in one embodiment, during a free spin round, each mystery symbol indicator 64 is split to reveal two symbols, which are each evaluated as being present at the respective symbol location of the mystery symbol indicator 64. Such a feature is depicted in FIG. 14, which shows a matrix 51 during a free spin bonus round. Several mystery symbol indicators 64 are present, and shown as being split into both "K" symbols and Fish symbols, which are both evaluated.

Figure 15:
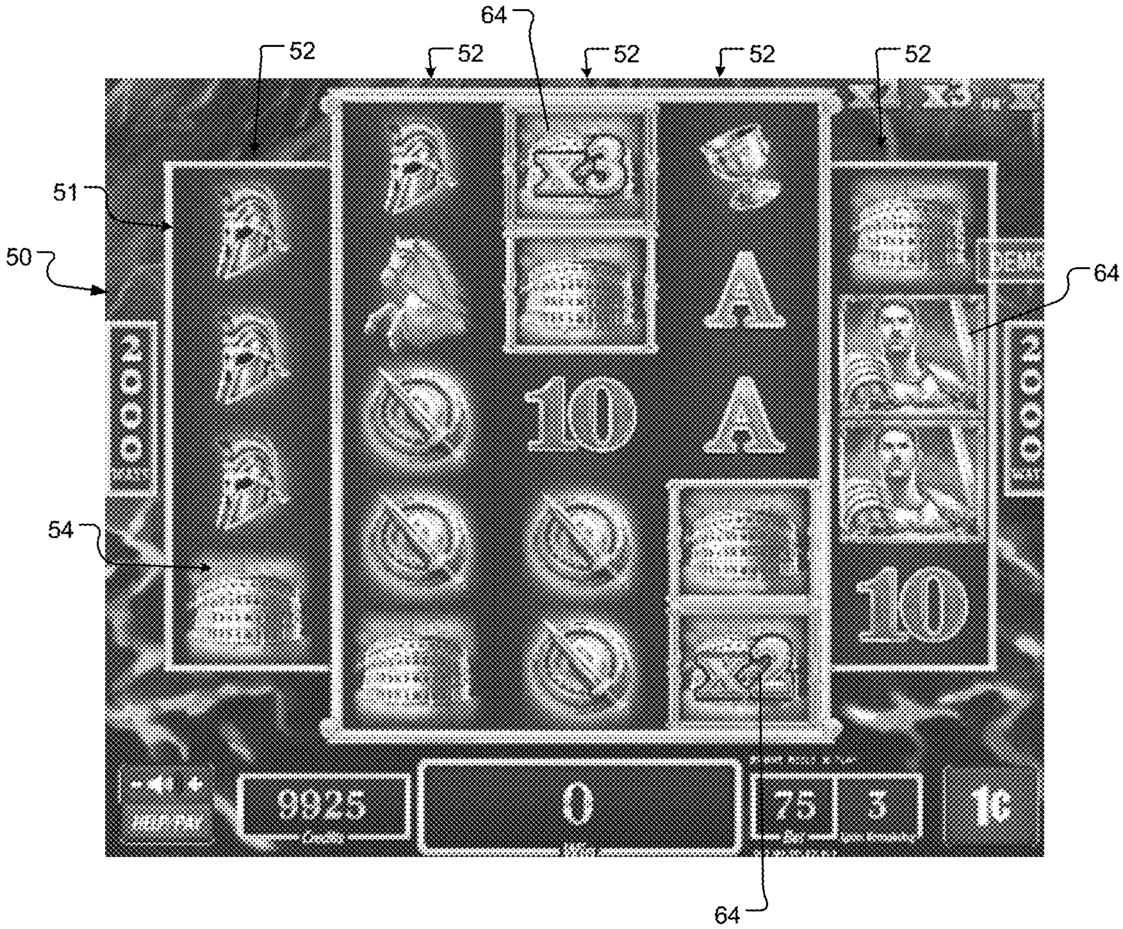
FIG. 15 shows a partial game screen of a free spin bonus round including a mystery symbol indicator according to some additional embodiments.

As another example, in one embodiment, some of the mystery symbol indicators 64 are enhanced to also provide a multiplier value to awards formed using the symbols therein. Such a feature is shown in FIG. 15, where a matrix 51 is depicted including a free spin result with multiple mystery symbol indicators 64. As shown by the "x3" and "x4" indicia on two of the symbols associated with mystery symbol indicators 64, these symbols have been randomly selected to include a multiplier enhancement. The multiplier is applied to all awards won using the location.

Figure 16:
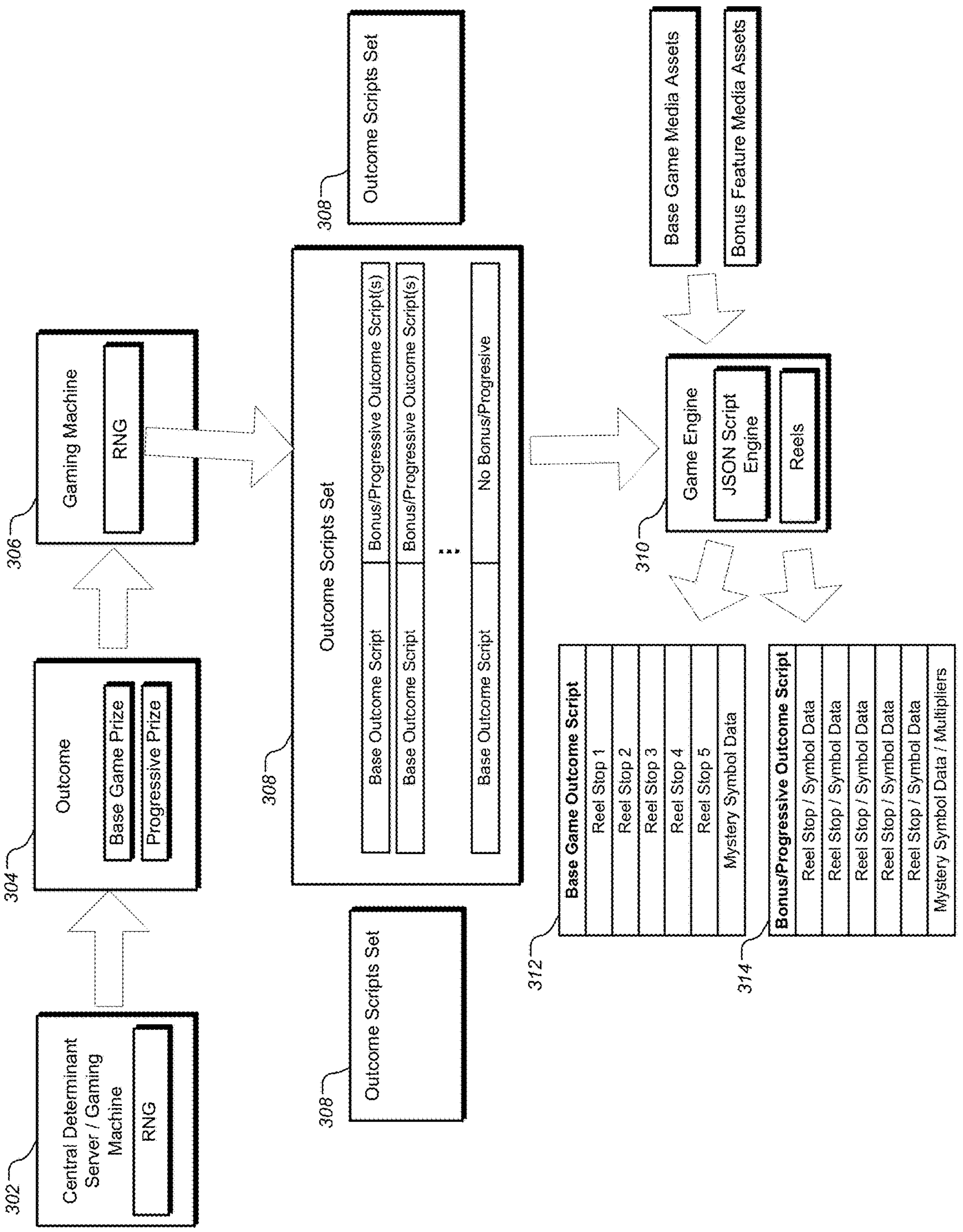

FIG. 16 shows a block diagram of software and data structures performing operations employed in operating a bonus game according to some embodiments. In response to a wager activation or game activation (for example, FIG. 12, block 1204), at block 302 a random number generation is performed, either at central determinant server or the gaming machine. For centralized gaming architectures such as class II type games or lotto-based games, the central determinant server performs this step. For class III type games, typically an RNG on the gaming machines performs this step. The RNG may be a hardware-based RNG conforming to local regulations for both security and random distribution of outcomes.

At block 304, the random number is employed to select an outcome. Typically the outcome is by using the random number to index or access a pool of outcomes having a distribution of prizes which correlates to the desired game math characteristics for the game, including prize distribution and payout percentages. The selected outcome has a possibility of including only a base game prize and a possibility of including a base game prize and a bonus prize or progressive prize. The typically outcome includes the prize amount for the base game outcome, which may be zero, and the prize amount for the bonus/progressive game outcome, which may be zero.

As shown at block 306, the gaming machine next employs this outcome to operate the game and provide a result. If a central determinant server is used, the outcome is passed to the gaming machine at block 306. If a local RNG is used to select an outcome, the gaming machine is in possession of the outcome. As depicted by the arrow from block 306, the gaming machine uses the prize amount selects a set of outcome scripts 308 from among a group of such sets, each group containing outcome scripts for operating the gaming machine to provide a particular prize amount. The selected set 308 includes multiple scripts which are executable to operate the gaming machine to provide the prize amounts in the outcome in various forms. For example, if the outcome is a base game prize of 200 credits, and no bonus prize, the selected set 308 contains a set of scripts for operating the gaming machine to provide 200 credits through a base game outcome. If the outcome is a base game prize of 100 credits and a bonus game prize of 200 credits, the selected set 308 contains a set of scripts for operating the gaming machine to provide this combination of prizes, each script including base game scripting and bonus or progressive game scripting. From this set, the gaming machine RNG is employed to generate a random number which is used to index the set 308 to select one of the scripts for execution. In some embodiments, further variation is provided for the bonus/progressive prize by generating an additional RNG to determine whether to present the bonus/progressive prize as a single prize or multiple prizes. The selected script may include a base game script and a bonus game script, or only a base game script, as shown by the depicted outcome including a base outcome script and "No Bonus/Progressive".

Figure 17:
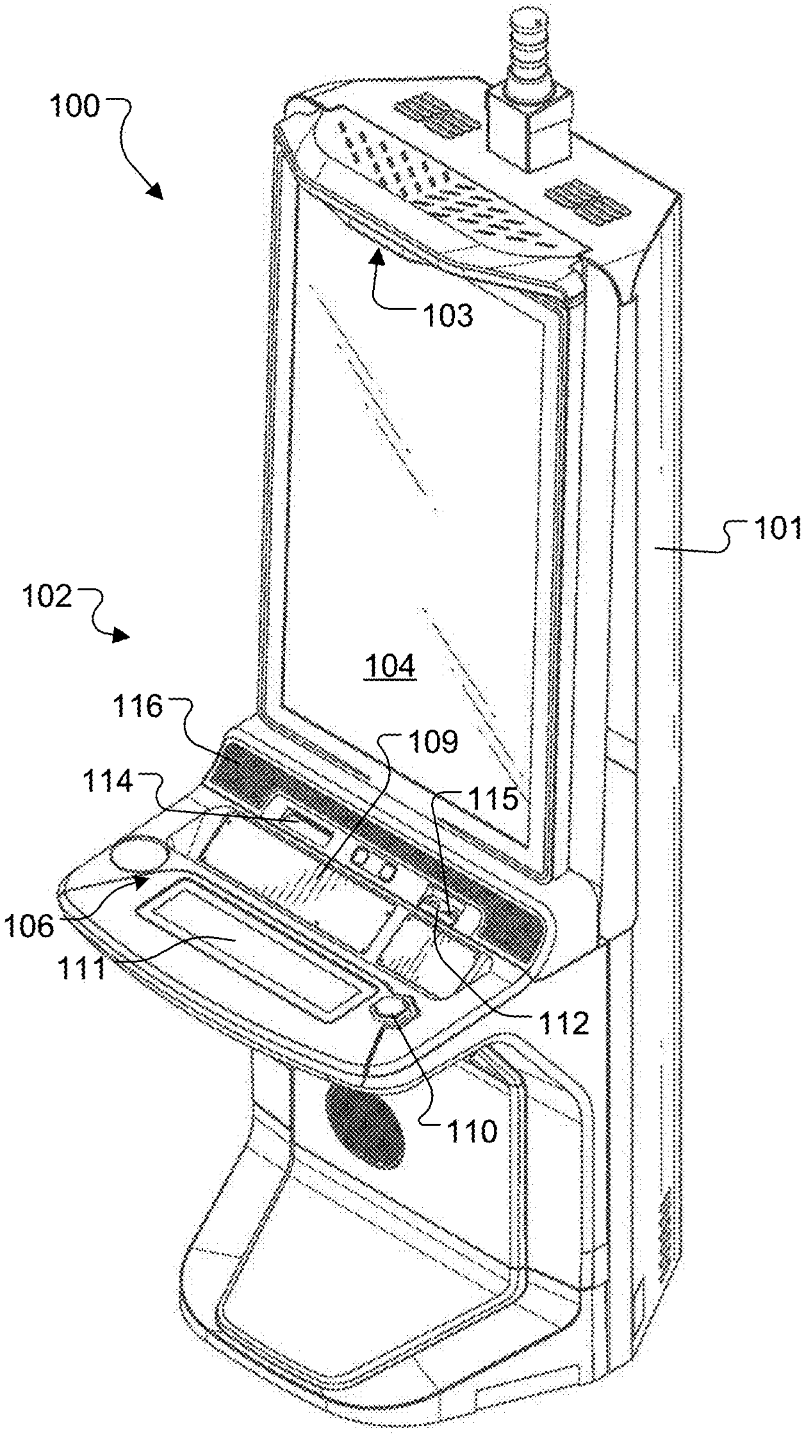
FIG. 17 shows a gaming machine that may be used to implement feature games according to some embodiments.

As shown at block 310, the selected script is then loaded to a game engine to operate the gaming machine to provide the outcome. In a preferred embodiment, a JSON script engine is employed to execute the script. The JSON script engine accesses media assets from the game module such as base game media assets and bonus/progressive feature media assets contained in data structures 230 and 232 (FIG. 17). It executes the base game outcome script using data structures for simulated reels, typically using a set of reel stops provided in the script to implement the base game prize amount.

The reels include game symbols and mystery symbol indicators with the function described above at various locations. As shown in base game outcome script 312, a base game outcome script includes reel stops for each reel, and mystery symbol data including the symbols that are to be revealed by mystery symbol indicators 64 in the initial base game result and any cascade results included in the base game result. The cascade effect is operated as described above with respect to FIG. 1 through FIG. 13, with symbols participating in a winning pattern removed, and symbols "above" the array on the simulated reels dropping down to populate locations, when they are not blocked by symbols that remained on the screen. When cascades occur, the total prize determined for the base game outcome is provided by the sum of all awards from the initial spin result plus the cascade results. The results are evaluated and prizes awarded by the gaming engine.

When a free spin bonus or other bonus outcome is included, the process uses a bonus/progressive outcome script 314. For example, if a free spin bonus like that of FIG. 14 or that of FIG. 15 are included, bonus/progressive outcome script 314 includes reel stops for each free spin, and mystery symbol data to control the symbols and extra features of each mystery symbol indicator included in the spin results and cascade results resulting from the free spins. For example, for the double symbol feature of FIG. 14, the double symbols revealed for each mystery symbol indicator 64, the mystery symbol data indicates which symbols appear therein. Similarly, for the multiplier feature of FIG. 15, the mystery symbol data indicates any multiplier to be applied for each free spin result and any cascade results.

Media assets such as bonus celebration and audio assets are also accessed in presenting the bonus/progressive prize after the bonus/progressive outcome script operates the gaming machine to implement the bonus/progressive sequence as described above.

Figure 18:
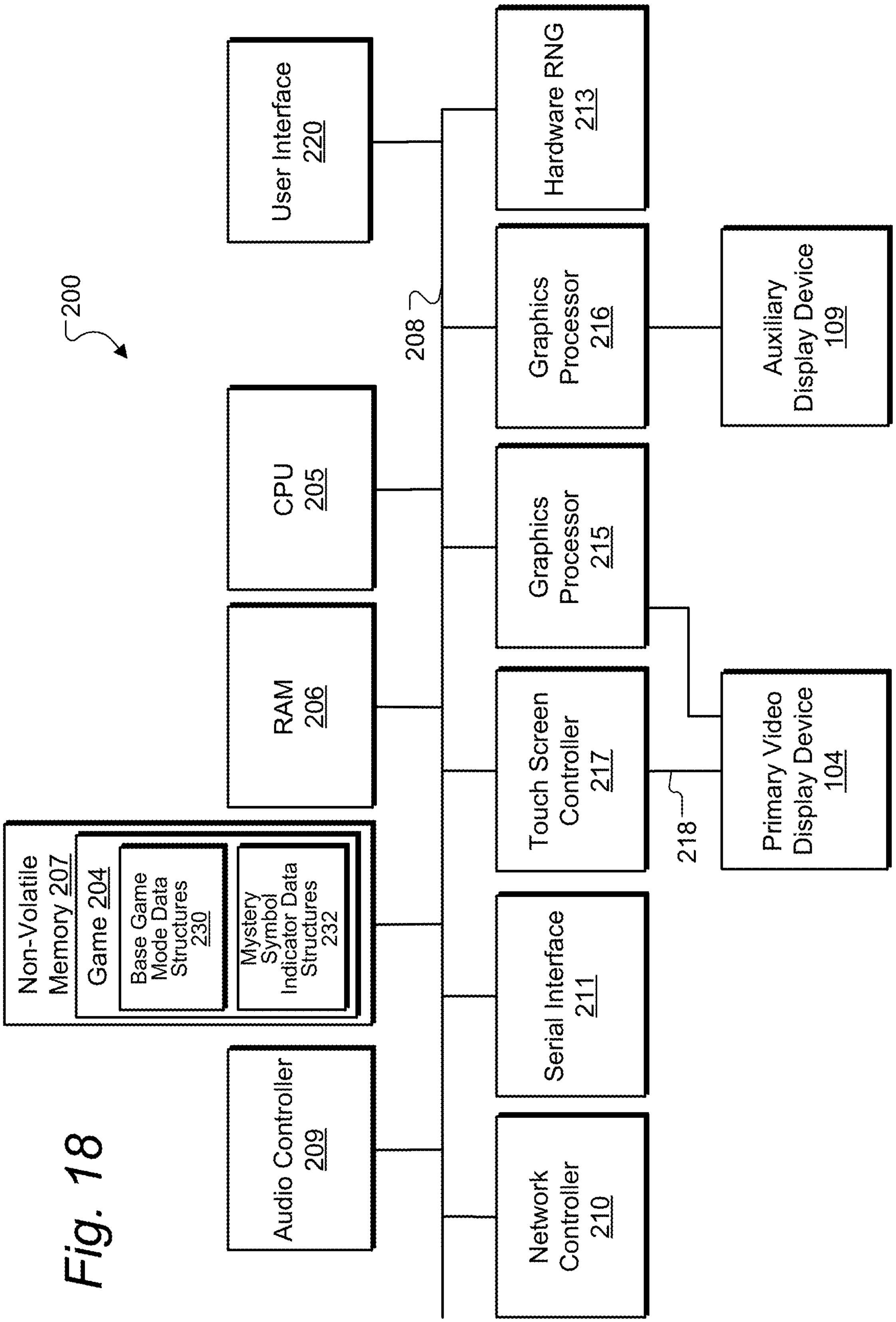
FIG. 18 shows a hardware and logical block diagram of gaming machine according to some embodiments.

FIG. 17 shows a gaming machine 100 that may be used to implement feature games according to the present invention. The block diagram of FIG. 18 shows further details of gaming machine 100. Referring to FIG. 17, gaming machine 100 includes a cabinet 101 having a front side generally shown at reference numeral 102. Gaming machine 100 includes a display system including one or more display devices such as video displays or mechanical display devices such as spinnable reels or wheels. In the depicted version, the display system includes a primary video display device 104 which is mounted in a central portion of the front side 102, with a ledge 106 positioned below the primary video display device and projecting forwardly from the plane of the primary video display device. Gaming machine 100 also includes two additional smaller auxiliary display devices, and a lower auxiliary display device 109. All of the displays may include touchscreen sensors, especially auxiliary display device 109 which may be used to present touchscreen controls for wagering. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 17 also includes a number of mechanical control buttons 110 mounted on ledge 106. These control buttons 110 may allow a player to select a bet level, select paylines, select a type of game or game feature, and activate a play in the primary game. Further, primary video display device 104 in gaming machine 100 provides a convenient display device for implementing touchscreen controls.

Gaming machine 100 may also include a number of other player interface devices in addition to devices that are considered player controls for use in playing a particular game. Ledge 106 may also include a hardware special object including a button, touch sensor, or switches, joysticks, or other mechanical input devices, and/or virtual buttons and other controls implemented on a suitable touchscreen video display. Gaming machine 100 also includes a currency/voucher acceptor 112 having an input ramp, a player card reader having a player card input 114, and a voucher/receipt printer having a voucher/receipt output 115. One or more of these devices provides a credit input device in communication with the controller and adapted for accepting a physical item associated with a monetary value that establishes a player credit balance. Audio speakers 116 generate an audio output to enhance the user's playing experience. Numerous other types of devices may be included in gaming machines that may be used according to the present invention.

FIG. 18 shows a hardware and logical block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on system bus 208 and is connected to drive primary video display device 104 (mounted in cabinet 101 as shown in FIG. 17). A second graphics processor 216 is also connected on system bus 208 in this example to drive the auxiliary display device 109 also shown in FIG. 17. Gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other common electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 18 are known elements used in the gaming machine industry. These elements are preferably mounted in a computer chassis which is housed in cabinet 101 shown in FIG. 17. Alternatively, the various electronic components may be mounted on one or more circuit boards or modules housed within cabinet 101 without a separate enclosure. Those familiar with data processing systems and the various data processing elements shown in FIG. 18 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 18 as being connected directly on system bus 208 may in fact communicate with the other system components through a suitable expansion bus. Audio controller 209, for example, may be connected to the system via a PCI bus. System bus 208 is shown in FIG. 18 merely to indicate that the various components are connected in some fashion for communication with game processor/CPU 205 and is not intended to limit the invention to any particular bus architecture. Numerous other variations in the gaming machine internal structure and system may be used without departing from the principles of the present invention.

Although separate graphics processor 215 is shown for controlling primary video display device 104, and graphics processor 216 is shown for controlling both auxiliary display device 109, it will be appreciated that game processor/CPU 205 may control all of the display devices directly without any intermediate graphics processor. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, game processor/CPU 205 executes software which ultimately controls the entire gaming machine including the receipt of player inputs and the presentation of the graphic symbols displayed, and the cascade and mystery symbol indicator feature according to the invention through the display devices 104 and 109 associated with the gaming machine. As will be discussed further below, game processor/CPU 205 either alone or in combination with graphics processor 215 may implement a presentation controller for performing functions associated with a primary game that may be available through the gaming machine, and may also implement a game client for directing one or more display devices at the gaming machine to display the feature game mode according to the present invention. Game processor/CPU 205 also executes software related to communications handled through network controller 210, and software related to various peripheral devices such as those connected to the system through audio controller 209, serial interface 211, and touch screen controller 217. Game processor/CPU 205 may also execute software to perform accounting functions associated with game play. Random access memory 206 provides memory for use by game processor/CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included.

It should be noted that the invention is not limited to gaming machines employing the arrangement of processing devices and interfaces shown in example gaming machine 100. Other gaming machines through which the features herein are implemented may include one or more special purpose processing devices to perform the various processing steps for implementing the present invention, such as generating random numbers or checking the security status of software packages or gaming credit vouchers. Unlike processing devices such as game processor/CPU 205, these special purpose processing devices may not employ operational program code to direct the various processing steps.

Still referring to the hardware and logical block diagram 200 showing an example design for a gaming machine 100, the depicted machine in operation is controlled generally by game processor/CPU 205 which stores operating programs and data in non-volatile memory or storage device 207 with game module 204, and software or drivers for user interface 220, network controller 210, audio/visual controllers, and a hardware random number generator (RNG) 213, which is employed if software RNG procedures are not allowed in a particular gaming jurisdiction. Either hardware RNG 213 or a suitable software RNG are employed for making the random selections of game outcomes, reel stop positions, etc. when operating the game as described herein. The game module 204, once installed, also is held in non-volatile memory of the EGM, preferably a separate flash drive or hard drive from the memory holding the EGM operating system. CPU or game processor/CPU 205 may comprise a conventional microprocessor, such as an Intel microprocessor, mounted on a printed circuit board with supporting ports, drivers, memory, software, and firmware to communicate with and control gaming machine operations, such as through the execution of coding stored in non-volatile memory or storage device 207 including one or primary game modules 202, including executable code and data structures such as data structures 230 for performing the primary or base game mode, and data structures 232 for providing the mystery symbol indicators and their graphic sequences as described above. Game processor/CPU 205 connects to user interface 220 such that a player may enter input information, and game processor/CPU 205 may respond according to its programming, such as to apply a wager and initiate execution of a game.

Figure 19:
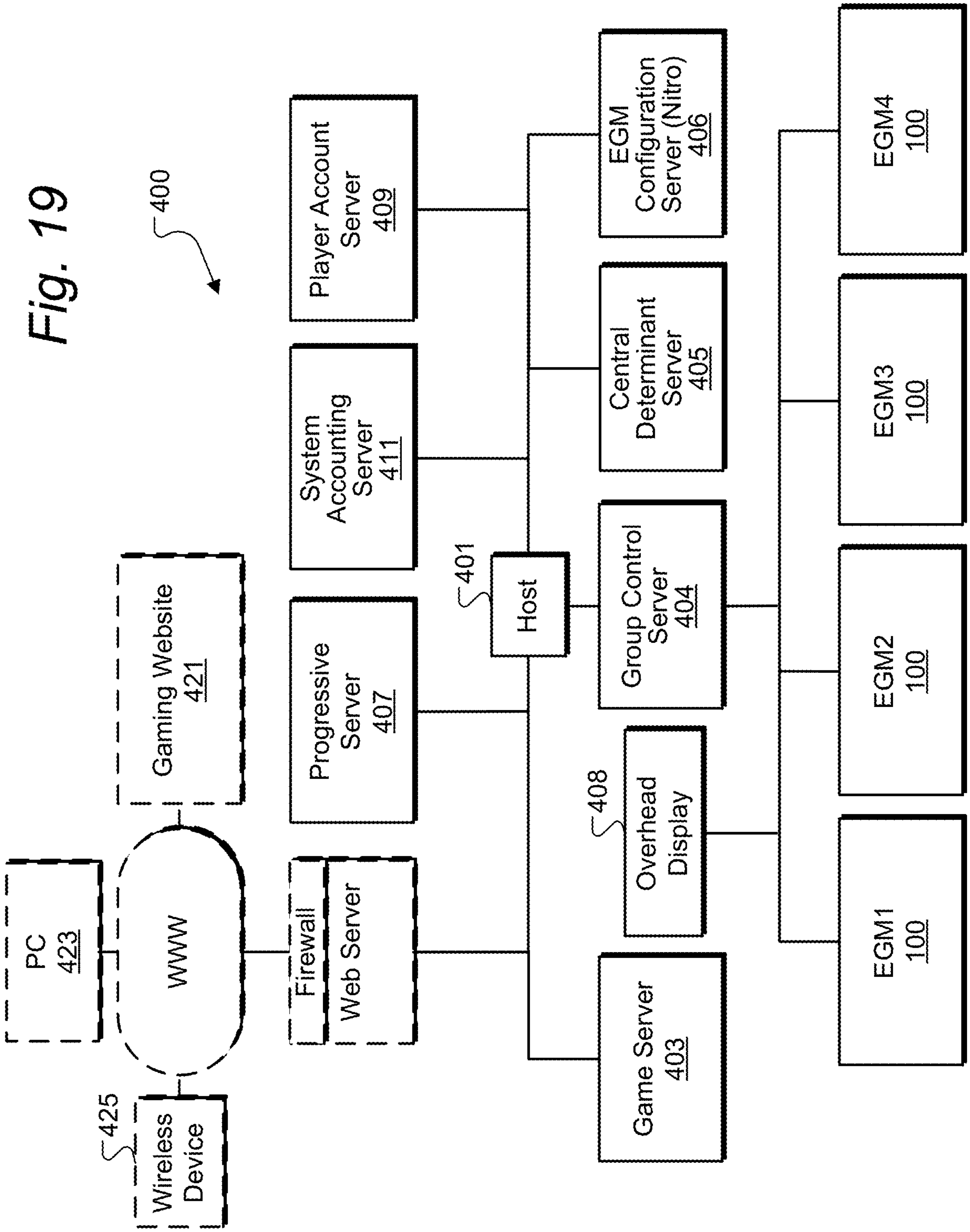
FIG. 19 shows a block diagram of a network system including multiple servers and gaming machines.

Game processor/CPU 205 also may connect through network controller 210 to a gaming network, such as example casino server network 400 shown in FIG. 19.

Referring now to FIG. 19, the casino server network 400 may be implemented over one or more site locations and include host server 401, and an EGM configuration server 406 (in the preferred version the Even Games Nitro Host server) for managing the configuration of multiple EGMs 100 on the network. A group display device 408 is coupled to casino server network 400 may include its own controller and graphics processor for driving the group display in response to commands received over a network connection. The network may also include remote game play server 403 (which may be configured to provide game processor functionality including determining game outcomes and providing audio/visual instructions to a remote gaming device), a group control server 404, central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards. While some of the servers have been shown separately, they may be combined or split into additional servers having additional capabilities.

As shown, networked electronic gaming machines 100 (EGM1-EGM4) and one or more overhead group displays 408 may be network connected and enable the content of one or more displays of gaming machines 100 to be mirrored or replayed on an overhead display. EGMs 100 may also feed celebration graphics directly to the overhead displays 408 in the course of providing games, for example to show a celebration for a large bonus win or group gaming mode win on a particular EGM 100. Typically the overhead display function and group celebration scenarios are managed by a floor messaging server such as Nitro floor messaging server 404, which receives messages from EGM's 100 to communicate group gaming mode wins, bonus game wins, or awards of other large prizes such as progressive prizes. The primary display content may also be stored by the display controller or game processor/CPU 205 and transmitted through network controller 210 to the overhead display controller either substantially simultaneously or at a subsequent time according to either periodic programming executed by game processor/CPU 205 or a triggering event, such as a jackpot or large win, at a respective gaming machine 100. In the event that gaming machines 100 have cameras installed, the respective player's video images may be displayed on overhead display 408 along with the content of the player's gaming machine 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e. g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor/CPU 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Apple iPhone, Android phone, tablet, phablet, virtual reality device, iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for controlling operation of a gaming machine, the method including:

responsive to a play input entered through a player input device of the gaming machine and under control of a processing system of the gaming machine, causing a display system of the gaming machine to display a base result representation in a first area of the display system comprising a matrix of symbol locations including multiple columns and rows;

responsive to a winning pattern formed in the base result representation, causing the display system to display one or more cascade sequences in which symbols participating in any winning combination are removed from matrix, further symbols drop into the symbol locations of the removed symbols, and a cascade result is evaluated; and providing mystery symbol indicators in the base result representation, the mystery symbol indicators configured to:

temporarily conceal and then reveal a symbol during a reel spin animation of the base result representation; and once appearing in the base result representation, persist in the matrix of symbol locations during the one or more cascade sequences, and temporarily conceal and then reveal a new symbol during at least one of the one or more cascade sequences.

2. The method of claim 1 wherein the mystery symbol indicators are further configured to reveal a symbol identical to that of all other mystery symbol indicators during the one or more cascade sequences.

3. The method of claim 1 further comprising moving an existing mystery symbol indicator to a new symbol location during a symbol cascade sequence responsive a symbol below it being removed.

4. The method of claim 1 wherein the mystery symbol indicators are further configured to provide a symbol identical to that of all other mystery symbol indicators in the base result representation.

5. The method of claim 1 further comprising:

responsive to a bonus condition in the base result representation, causing the display system to display a free spin round in which multiple free spins are conducted and evaluated to produce a respective free spin result;

responsive to a winning pattern formed in the free spin result, causing the display system to display one or more cascade sequences in which symbols participating in any winning combination are removed from the respective free spin result, further symbols drop into the symbol locations of the removed symbols, and a free spin cascade result is evaluated; and providing mystery symbol indicators in the free spin result, the mystery symbol indicators configured to:

temporarily conceal and then reveal a symbol during a reel spin animation of the free spin; and once appearing in the free spin result, persist in the matrix of symbol locations during the one or more cascade sequences, and temporarily conceal and then reveal a new symbol during at least one of the one or more cascade sequences.

6. A gaming machine comprising:

a display system, an audio device, a player input device, and a processing system operatively coupled to the display system, the audio device, and the player input device and configured to execute instructions related to a game; and tangible, non-transitory electronically accessible memory coupled to the processing system and containing program code executable by the processing system for:

responsive to a play input entered through the player input device and under control of the processing system of the gaming causing the display system to display a base result representation in a first area of the display system comprising a matrix of symbol locations including multiple columns and rows;

responsive to a winning pattern formed in the base result representation, causing the display system to display one or more cascade sequences in which symbols participating in any winning combination are removed from the matrix, further symbols drop into the symbol locations of the removed symbols, and a cascade result is evaluated; and providing mystery symbol indicators in the base result representation, the mystery symbol indicators configured to:

temporarily conceal and then reveal a symbol during a reel spin animation of the base result representation; and once appearing in the base result representation, persist in the matrix of symbol locations during the one or more cascade sequences, and temporarily conceal and then reveal a new symbol during at least one of the one or more cascade sequences.

7. The gaming machine of claim 6 wherein the mystery symbol indicators are further configured to reveal a symbol identical to that of all other mystery symbol indicators during the one or more cascade sequences.

8. The gaming machine of claim 6 wherein the program code is further executable for moving an existing mystery symbol indicator to a new symbol location during a symbol cascade sequence responsive a symbol below it being removed.

9. The gaming machine of claim 6 wherein the mystery symbol indicators are further configured to provide a symbol identical to that of all other mystery symbol indicators in the base result representation.

10. The gaming machine of claim 6 wherein the program code is further executable for:

responsive to a bonus condition in the base result representation, causing the display system to display a free spin round in which multiple free spins are conducted and evaluated to produce a respective free spin result;

responsive to a winning pattern formed in the free spin result, causing the display system to display one or more cascade sequences in which symbols participating in any winning combination are removed from the respective free spin result, further symbols drop into the symbol locations of the removed symbols, and a free spin cascade result is evaluated; and providing mystery symbol indicators in the free spin result, the mystery symbol indicators configured to:

temporarily conceal and then reveal a symbol during a reel spin animation of the free spin; and once appearing in the free spin result, persist in the matrix of symbol locations during the one or more cascade sequences, and temporarily conceal and then reveal a new symbol during at least one of the one or more cascade sequences.

11. Tangible, non-transitory computer readable media holding a program product for execution by a processing system of a gaming machine, the program product including machine instruction program code for:

responsive to a play input entered through a player input device of the gaming machine, causing a display system of the gaming machine to display a base result representation in a first area of the display system comprising a matrix of symbol locations including multiple columns and rows;

responsive to a winning pattern formed in the base result representation, causing the display system to display one or more cascade sequences in which symbols participating in any winning combination are removed from the matrix, further symbols drop into the symbol locations of the removed symbols, and a cascade result is evaluated; and providing mystery symbol indicators in the base result representation, the mystery symbol indicators configured to:

temporarily conceal and then reveal a symbol during a reel spin animation of the base result representation; and once appearing in the base result representation, persist in the matrix of symbol locations during the one or more cascade sequences, and temporarily conceal and then reveal a new symbol during at least one of the one or more cascade sequences.

12. The media holding a program product of claim 11 wherein the mystery symbol indicators are further configured to reveal a symbol identical to that of all other mystery symbol indicators during the one or more cascade sequences.

13. The media holding a program product of claim 11 wherein the program code is further executable for moving an existing mystery symbol indicator to a new symbol location during a symbol cascade sequence responsive a symbol below it being removed.

14. The media holding a program product of claim 11 wherein the mystery symbol indicators are further configured to provide a symbol identical to that of all other mystery symbol indicators in the base result representation.

15. The media holding a program product of claim 11 wherein the program code is further executable for:

responsive to a bonus condition in the base result representation, causing the display system to display a free spin round in which multiple free spins are conducted and evaluated to produce a respective free spin result;

responsive to a winning pattern formed in the free spin result, causing the display system to display one or more cascade sequences in which symbols participating in any winning combination are removed from the respective free spin result, further symbols drop into the symbol locations of the removed symbols, and a free spin cascade result is evaluated; and providing mystery symbol indicators in the free spin result, the mystery symbol indicators configured to:

temporarily conceal and then reveal a symbol during a reel spin animation of the free spin; and once appearing in the free spin result, persist in the matrix of symbol locations during the one or more cascade sequences, and temporarily conceal and then reveal a new symbol during at least one of the one or more cascade sequences.

* * * * *